Patented Sept. 17, 1935

2,014,794

UNITED STATES PATENT OFFICE 2,014,794

LAUNDRY STARCH AND METHOD OF PREPARING THE SAME

George M. Bierly, Columbus, Ohio

No Drawing. Application June 11, 1934,
Serial No. 730,067

2 Claims. (Cl. 134—19)

This invention relates to starch, and particularly to a starch composition for laundry use; a novel starch composition and method of preparing the same; as hereinafter described and claimed.

One of the achieved objects of the invention is to provide a starch composition which has an exceedingly low congealing factor under the conditions of use. Another object of the invention is to provide the consumer with a starch mixture in standard tablet or cake size, the tablets or cake being dispersible or soluble in cold water.

An important and essential feature of the present invention resides in providing a starch mixture containing an ester of a fatty alcohol; comprehending the dry blending of a rice or other equivalent starch with a sulfate ester of a fatty alcohol of the higher members of the series of alcohols obtainable from glycerides of various higher fatty acids. These fatty alcohols usually have 10 or more carbon atoms per molecule.

The applicant has discovered that starch compositions including sulfated or sulfonated organic compounds such as the sulfate ester of a fatty alcohol have the unexpected characteristics of being highly penetrating, lubricating, substantially non-congealing and having a high gloss.

The preferred method of compounding the novel product is as follows:

A thin-boiling rice starch designated as 46 viscosity is preferably used as a base. A starch designated as 46 viscosity is in comparison with a viscosity of water designated as 23; in other words, a starch of 46 viscosity has a viscosity twice that of water when the starch and water solution is boiled for 20 minutes and possesses a concentration of 12 ounces of starch to 1 gallon of solution. The preferred mixture thus contemplates a rice starch of definite viscosity. Other starches, corn, wheat, potato, tapioca, sago, sweet potato and other viscosities or fluidities may be employed within the spirit and scope of the invention.

To a thin-boiling rice starch of 46 viscosity, in commercially dry form, 1% by weight of a sulfate ester of a fatty alcohol of one or more of the higher members of the series aforesaid is added and thoroughly mixed by dry blending. A sufficient amount of water-soluble binder, such as glucose or its equivalent, is added in the amount of about 2% by weight. A modicum of an aromatic is added as a perfume and any desired color is incorporated in the mixture. The entire mixture is compressed in standard tablet forming equipment into tablets or cakes weighing approximately one ounce.

The manner of use of the product tablet is as follows:

The tablet is dispersed to a smooth cream in a small amount of cold water and then diluted to 1 quart with boiling water, whereupon the resulting solution is of the proper consistency for starching the average wearing apparel.

The use of sulfonated alcohols as detergents is acknowledged to be old in the prior art, but the applicant has discovered that when such a sulfonated alcohol is mixed with starch, the starching attributes are unexpectedly and materially changed to great advantage. This is a new technical effect which was not to be foreseen nor expected from the prior teachings of the art. The sulfonated alcohol may be bought in the open market, or may be prepared in accordance with known literature on the subject.

I have found sulfate ester of stearyl alcohol, $C_{18}$, to be quite suitable in the production of my improved starch product. However, I may employ sulfate ester of lauryl alcohol, $C_{12}$, containing some sulfate ester of the fatty alcohols, $C_{16}$ and $C_{14}$; sulfate ester of oleyl alcohol, $C_{18}$, containing small percentages of $C_{14}$ and $C_{16}$ alcohols as sulfate esters; double sulfate ester of oleyl alcohol; or a sulfate ester of a mixture of alcohols, $C_{14}$, $C_{16}$ and $C_{18}$, in which the $C_{14}$ alcohol predominates. These compounds are obtainable under the commercial names of Gardinol and Avirol. The sulfate ester of stearyl alcohol and oleyl alcohol contain a relatively small percentage of free fatty alcohol which is unsulfonated, which serves the purpose of providing a finishing effect on textile materials. These compounds are soluble and follow the line of dispersion according to the number of carbon atoms in the chain alcohol, that is, they compare to the titre of soaps, depending upon the fatty acid used.

A specific formula suitable under the present invention is as follows:

Example 97 lbs. of commercially dry rice starch.
1 lb. of sulfated fatty alcohol.
2 lbs. of glucose.
Color and aromatics as desired.

It will be clear that either or both the color or the perfume may be omitted from the starch product as desirable or necessary. The invention is not to be construed as limited to a product in tablet form, as it will be obvious that the product may be made up in bulk, and sold in either dry, powdered, granulated or lump form. It may be made up as a solution for dilution with boiling water and sold in bottles or other containers.

What is claimed is:

1. A dry potentially reactive laundry starch composition having low congealing and high gloss characteristics comprising starch having a viscosity in water approximately twice that of water and approximately one percent of a sulfate ester of a fatty alcohol of the higher members of the series of alcohols obtainable from glycerides of higher fatty acids and containing at least 10 carbon atoms to the molecule.

2. A dry potentially reactive laundry starch composition in tablet form having low congealing and high gloss characteristics consisting of starch having a viscosity in water approximately twice that of water, approximately one percent of a sulfate ester of a fatty alcohol of the higher members of the series of alcohols obtainable from glycerides of higher fatty acids and containing at least 10 carbon atoms to the molecule, and a water soluble binder.

GEORGE M. BIERLY.